Patented Aug. 29, 1939

2,171,320

UNITED STATES PATENT OFFICE 2,171,320

PROCESS OF PREPARING EXTRACTS OF SPLEEN AND LIVER

Carl Ludwig Lautenschläger and Willy Ludwig, Frankfort-on-the-Main, Germany, assignors to Winthrop Chemical Company, Inc., New York, N. Y., a corporation of New York No Drawing. Application October 5, 1936, Serial No. 104,152. In Germany October 5, 1935

4 Claims. (Cl. 167—74)

The present invention relates to a process of preparing extracts of spleen and liver, more particularly to such extracts as are free from albumin and are efficacious against bacterial toxins.

It is known that the spleen and the liver play in the body an important part as defensive organs against the exciters of infectious diseases or against their toxins. It has, however, hitherto been impossible to obtain from these organs the antitoxins that kill the bacteria or neutralize the toxins in a state free from albumin.

The process of this invention is based on the following observation: By extracting comminuted spleen or liver of normal animals with water or physiological sodium chloride solution at a neutral reaction and at a low temperature, i. e. below about 40° C. and treating the resultant extracts with agents that precipitate albumin, extracts are obtained which are not or are only slightly active against bacterial toxins. By extracting, however, the said organs for a prolonged time at a feebly acid reaction, i. e. at a pH-value between about 4 and about 6, and eliminating the ballast substances present in the solutions thus produced, extracts are obtained which are free from albumin and are highly efficacious against bacterial toxins.

By the action of the weak acids the antitoxins appear to be loosened in their union with the protein of the organ and are then capable of being extracted. This opinion is supported by the following observation: By starting from spleens or livers of animals which have already been subjected to an immunizing process it is possible to obtain extracts having a strongly antitoxic action by simply extraction of the organs at a feebly acid reaction. In this case a short operation is evidently sufficient to extract the antitoxins which, as is known, are present in immune organs in large quantities. When the starting materials are, however, the spleens and livers of normal animals, such a short extraction is not sufficient. Also in this case extracts containing antitoxins are obtained, but their contents of antitoxins is considerably smaller than when the organs extracted are from immune animals.

If when organs of non-immunized animals are used the extraction process is preceded by an autolysis of, for instance, 3 to 4 days there are obtained, as in the simple extraction of organs of immunized animals, extracts of a high efficacy.

For purifying the extracts thus obtained there may be used as ballast-eliminating substances the usual agents, namely, iron dialysate, lead acetate or the like. The active substances contained in the solution after the elimination of the ballast substances may be further purified by a treatment with organic solvents, preferably after the evaporation of the solutions. Alternately the extracting agent may be, instead of water, an organic solvent soluble in water, such as methyl alcohol, or a mixture of such a solvent with water, at a feebly acid reaction; extracts are thus directly obtained which are poor in ballast substances such as albumin, electrolytes, etc.

The active substances obtained by the process of this invention are thermolabile, soluble in water and free from albumin. By injecting subcutaneously or intraperitoneally the extracts produced by the process into animals (rats, guinea pigs, rabbits, etc.) which are poisoned with bacterial toxins such as diphtheria, tetanus or the like, the toxins contained in the animals are neutralized. The animals survive, whereas the non-treated control-animals die. The efficacy of the extracts may be shown by mixing the toxins with the extracts and injecting the mixture into the animals. Also in this case the toxins are neutralized; the animals remain healthy, whereas the control animals fall ill.

The following examples serve to illustrate the invention, but they are not intended to limit it thereto:

(1) 2 kilos of spleen of non-immunized animals (cattle) are finely ground, the mass is mixed, while stirring, with 200 cc. of toluene and the whole is autolyzed at 37° C. to 38° C. for 4 days. During this time the viscid mass is transformed into a thin paste. The whole mass is run into 6 liters of 1/100 N-hydrochloric acid and stirred for 3 hours. The solid parts are removed by centrifuging and the extract is freed from albumin with the aid of 260 cc. of iron dialysate. The clear filtrate is dried and the residue is extracted at room temperature with highly concentrated methyl alcohol (6 times, each time with 200 cc.). The portion soluble in alcohol contains the active substance. After elimination of the alcohol a feebly hygroscopic powder is obtained. It is readily soluble in water and in methyl alcohol; it is free from albumin and when heated for a prolonged time to 90° C. it loses its antitoxin property.

Instead of 1/100 N-hydrochloric acid 6 liters of ethyl or methyl alcohol of 40 per cent strength may be used as extracting agent with the same result.

(2) 1 kilo of spleen of an immunized horse is ground and the magma is run into 3 liters of 1/100 N-hydrochloric acid. The whole is stirred for 6 to 8 hours. The solid parts are then removed by centrifuging, the extract is freed from albumin by means of 300 cc. of iron dialysate and dried. The product is further purified as described in Example 1. The yield amounts to 50 grams.

(3) 5 kilos of liver of non-immunized animals (cattle) are autolyzed at 35° C. for 3 days with 300 cc. of toluene, while frequently stirring. 15 liters of 1/100 N-acid are then added and the whole is further treated as in Example 1. The yield amounts to 300 grams.

We claim:

1. The process for obtaining antitoxin which comprises extracting at a feebly acid reaction an animal organ of the group consisting of autolysed spleen and autolysed liver with an extracting agent selected from the group consisting of water, aliphatic organic solvents of a low molecular weight soluble in water and mixtures of these organic solvents with water, treating the solutions obtained with a ballast-eliminating agent of the class of heavy metal compounds and further purifying the resultant products by means of an organic solvent soluble in water, all process steps being carried out at a temperature below about 40° C.

2. Process as defined in claim 1 in which the extract, after the treatment for the elimination of ballast substance is further purified by evaporating it to dryness and extracting the residue with an organic solvent soluble in water.

3. Process as defined in claim 1 in which the extract, after the treatment for the elimination of ballast substance is further purified by evaporating it to dryness and extracting the residue with concentrated methyl alcohol.

4. As a new product an antitoxin which is thermolabile, soluble in water and free of albumin obtained by the process defined in claim 1.

CARL LUDWIG LAUTENSCHLÄGER.
WILLY LUDWIG.